United States Patent [19]

Birkenfeld et al.

[11] 4,171,178
[45] Oct. 16, 1979

[54] APPARATUS FOR AUTOMATICALLY HANDLING STACKS OF BAGS

[75] Inventors: Richard Birkenfeld; Werner Thun; Peter Aka, all of Beckum, Fed. Rep. of Germany

[73] Assignee: Maschinenfabrik E. Möllers GmbH & Co., Beckum, Fed. Rep. of Germany

[21] Appl. No.: 890,950

[22] Filed: Mar. 28, 1978

[30] Foreign Application Priority Data

Mar. 31, 1977 [DE] Fed. Rep. of Germany ....... 2714333

[51] Int. Cl.² ............................................. B65G 67/04
[52] U.S. Cl. ................................. 414/45; 104/128; 104/172 B; 414/341; 414/342
[58] Field of Search ................. 214/6 P, 6 F, 38 C, 214/38 CC, 10.5 R; 104/127, 128, 172 B, 172 BT

[56] References Cited
U.S. PATENT DOCUMENTS

| | | |
|---|---|---|
| 2,798,267 | 7/1957 | Anderson .......................... 104/128 X |
| 2,808,157 | 10/1957 | Terill ........................... 214/10.5 R X |
| 3,096,727 | 7/1963 | Bell et al. ........................ 104/128 X |
| 3,788,496 | 1/1974 | Webb et al. ................ 214/38 CC X |
| 3,986,620 | 10/1976 | Wilde et al. .......................... 214/6 P |

FOREIGN PATENT DOCUMENTS

1346442  2/1974  United Kingdom ............... 214/38 CC

Primary Examiner—L. J. Paperner
Attorney, Agent, or Firm—Toren, McGeady and Stanger

[57] ABSTRACT

In an apparatus for automatically handling stacks of bags, initially the bags are formed into stacks, each stack is moved onto and along a conveying track and then unloaded from the track to a loading surface. The support surface on the conveying track for the stacks of bags has a number of recesses into which a prong-shaped support member can be inserted for lifting a stack from the track without using a pallet. The prong-shaped support member includes a stripping plate so that by moving the support member transversely of the plate, the stack on the support member can be displaced onto a loading surface. A carriage movable over the conveying track provides the support surface of the stack of bags. The conveying track includes upper rails for moving the carriage from the stack-forming end to the unloading end and lower rails for returning the carriage to the stack-forming end.

11 Claims, 11 Drawing Figures

APPARATUS FOR AUTOMATICALLY HANDLING STACKS OF BAGS

SUMMARY OF THE INVENTION

The present invention is directed to apparatus for automatically handling bags continuously received from a source, such as a bag-filling machine, and, more particularly, the apparatus includes a device for placing the bags in a stack, the conveying track for moving the stacks of bags to an unloading device. The support surface for the stacks on the conveying track is provided with a plurality of recesses so that a prong-shaped support member on the unloading device can remove a stack without using a pallet.

In a known arrangement for automatically handling bags, see DT-GM No. 76 20 782, a continuously operating conveying member is provided with projections which extend outwardly perpendicular to the plane of the conveying member. Between adjacent projections a duct-like open space is formed at one longitudinal side of the conveying member with the width and height of each space being larger than the corresponding dimensions of a fork on a lifting device. In such apparatus, if the conveying member has an adequate length, a plurality of stacks can be stored next to one another on the conveying member so that during a period when a full loading surface is being removed and replaced by an empty one, there is sufficient storage capacity on the conveying member to permit a bag-filling machine supplying the stack-forming device to operate continuously. Stacks removed from the conveying member without pallets are deposited directly on the loading surface or on pallets positioned on the loading surface. In removing the stored stacks, after an empty loading surface has been moved into position, the unloading device must be movable laterally relative to the conveying member for removing the stored stacks. Accordingly, adequate feeler and control devices must be provided.

Therefore, it is the primary object of the present invention to provide apparatus for removing the formed stacks at a certain location, preferably at the end of the conveying track, in such a manner that the entire operation can be performed automatically while maintaining a sufficient storage capacity on the conveying member to afford the replacement of a loading surface. Further, an unloading device should be used so that large double stacks can be taken from the conveying track and placed on the loading surface. The stacking device can form full stacks or half stacks of the double stack size for subsequent removal of the stack as a unit from the conveying member. In accordance with the present invention, the conveying member includes a conveying track with rails supporting carriages so that each carriage can receive one stack. The support surface on the carriages have recesses open at the top permitting the insertion of a prong-shaped support member for lifting the stack off the carriage. At the unloading end of the track, before or after a stack has been removed, the carriage can be moved from one set of rails to a second set located at a lower level for return to the stack-forming device. At the stack-forming device, a similar movement of the carriage is provided for return to the upper set of rails.

In this apparatus, it is possible to deliver stacks continuously from the stack-forming device to the conveying track until they reach a stationary unloading point. Moreover, it is possible to accumulate a plurality of stacks on the conveying track when the loading surface is being replaced, for example, when a loaded truck is removed and an empty truck is placed into the loading position. The length of the storage space provided on the conveying track does not start at the stack-forming device but at the unloading position or the opposite end of the conveying track from the stack-forming device. As a result, when an empty loading surface has been moved into position, the stored stacks can be automatically removed, for example, by moving them against a fixed stop. The stored stacks can be transferred onto the loading surface at an increased operating speed until they are all removed and the full length of the conveying track is again available for storing stacks required for the next exchange of the loading surface.

Another characteristic of the present invention is that the carriages which move the stacks over the rails can be disconnected from the rail and afford the possibility of dividing the carriage into two parallel carriage members releasably interconnected to one another with each capable of carrying a half stack. In such an arrangement, sections of rails are provided on the opposite sides of a stack-loading station at which half stacks are formed, for moving the carriage members individually into and out of the stack-loading station. The rail sections on either side of the stack-loading station are movable transversely of the direction of the conveying track to permit the loading of a half stack on each carriage member. After being loaded, the carriage members are moved toward one another and interconnected for movement as a unit over the conveying track.

With such an arrangement it is possible to use existing stack-forming devices which form stacks of a normal size, that is, stacks with five bags in each layer, for the formation of larger or double stacks. These double stacks are removed in a single unloading operation from the conveying track onto a truck, railroad car or the like.

At the unloading end of the conveying track a longitudinally movable unloading device can be positioned. This device includes a vertically and horizontally movable prong-shaped support member which can be inserted into the recesses in the support surface of the carriage on the conveying track, the recesses being opened to the support surface. The prong-shaped support member lifts a stack from the carriage and deposits it on the loading surface.

The unloading device can include a stripping plate. By withdrawing the prong-shaped support member transversely of the stripping plate, the stack on the member can be displaced onto the loading surface. Alternatively, pallets can be arranged on the loading surface with upwardly opening recesses. With such pallets, after the placement of a stack, the support member can be lowered and then withdrawn laterally from the recesses moving in the reverse order used in picking up the stack from the support surface on the conveying track. In such an operation, the support surfaces on the carriage and the pallet would be constructed in the same general manner.

For the side placement of stacks on the loading surface, the recesses in the carriages on the conveying track extend perpendicularly to the direction of the track and the prong-shaped support member is arranged so that it can move perpendicularly to the direction of the track.

If it is desired to place the stacks on the loading surface from the top or from the front, the recesses in the carriages extend in the same direction as the conveying track and the prong-shaped support member can be moved horizontally in the direction of the conveying track for removing a stack and for placing it on a loading surface.

In this arrangement of the apparatus, it is particularly advantageous if the unloading device includes a crane bridge movable along crane rails. A cantilever member supporting the prong-shaped support member is pivoted to the crane bridge for pivotal movement about a horizontal axis extending transversely of the direction of the conveying track. Accordingly, after the combination cantilever member and prong-shaped support member picks up a stack from a carriage it can be pivoted to a lower loading surface.

In an alternate arrangement of the loading device, in addition to a crane bridge movable along crane rails, a carriage is movable along the bridge between the rails. A support column depends downwardly from the carriage and is rotatable about a vertical axis with the prong-shaped support member fixed to the lower end of the column. Such a device allows the handling of stacks in many ways. For example, a stack can be lifted off the conveying track either transversely or longitudinally of the track. The crane rails can be arranged either transversely of or generally parallel to the rails of the conveying track. Similarly, the placement of stacks on the loading surface can be made in a number of different directions. Placement on the loading surface can be made from its side, from the top or from the rear as long as the prong-shaped support member is constructed to cantilever outwardly from the rotatable support column.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 4:
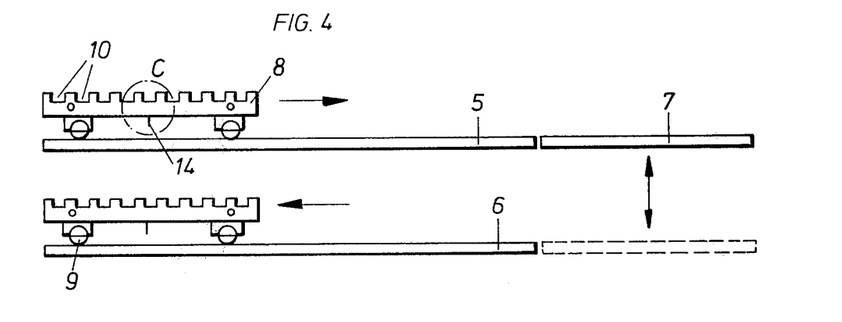
FIG. 4 is a schematic side view of the unloading end of the conveying track shown in FIG. 1.

In the embodiment illustrated in FIGS. 1–5, a stacking device 1 is located at one end of a conveying track 2 along which stacks 12 of layers of bags are moved to an unloading device 3. The unloading device 3 is movable over rails 4 extending in the same direction as the conveying track 2. As shown in FIG. 4, conveying track 2 has first rails 5 forming a an upper run and second rails 6 forming a lower run with a track section 7 positioned at the unloading device end of the conveying track. The track section 7 is vertically movable between alignment with the first rails 5 and the second rails 6. The vertical movement of the track section is provided by a driving means, not shown. At the stacking device end of the conveying track 2, a track section similar to track section 7 is provided and is vertically movable into alignment with either the first rails 5 or second rails 6. This track section is not illustrated.

Figures 1, 2, 3:
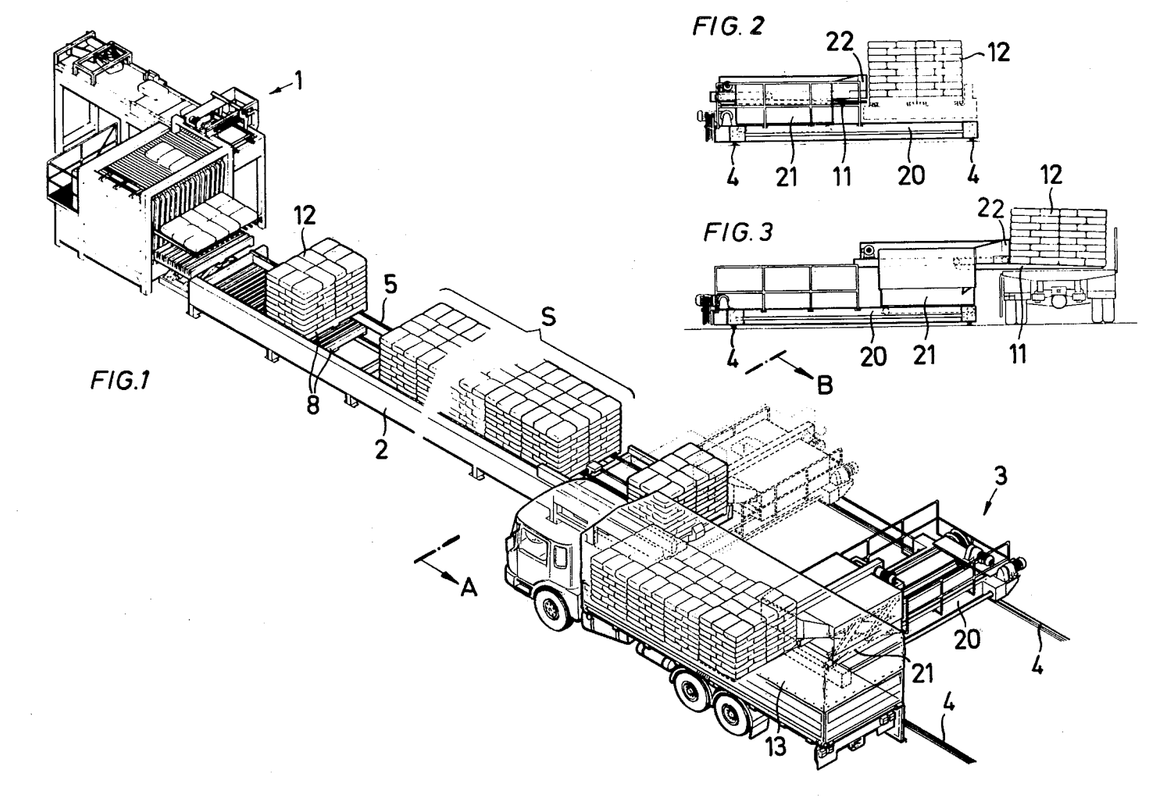
FIG. 1 is a perspective view of an apparatus embodying the present invention and includes a conveying track movably supporting carriages with each carriage carrying a stack of bags, a stack-forming device is provided at one end of the track and a stack-unloading device is positioned at the other end.
FIG. 2 is a side view taken along line A-B in FIG. 1 showing a stack removed from the conveying track by the unloading device.
FIG. 3 is a view similar to FIG. 2 illustrating the placement of the stack on the loading surface of a truck.

Carriages 8 are movable on rollers 9 over both the first rails 5 and second rails 6 of the conveying track 2. As illustrated in FIG. 1 and as shown more in detail in FIGS. 4 and 5, the support surface of the carriages 8 are provided in a comb-like fashion with recesses 10 extending transversely of the elongated direction of the conveying track. The unloading device 3 includes a prong-shaped support member 11 laterally movable into the recesses 10 in the carriages for lifting a stack of bags 12 as a unit off the carriage. Initially, the prong-shaped support member 11 is inserted horizontally into the recesses below the stack and then the stack is lifted vertically off the carriage by the support member. No pallet is necessary in this lifting operation. Subsequently, the unloading device 3 is moved away from the conveying track along the rails 4 into position for placing the stack on the loading surface of a truck 13. The unloading operation will be explained in more detail later.

Figure 5:
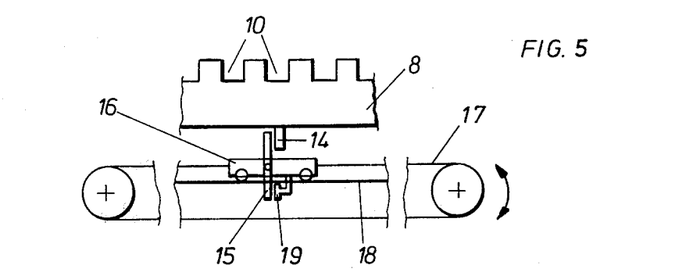
FIG. 5 is an enlarged detail view of the encircled portion C of FIG. 4.

As shown in FIGS. 4 and 5, the bottom of each carriage 8 is provided with a stop 14. This stop 14 is engageable with a pivotal latch 15 on a driving carriage 16. This driving carriage can be moved back and forth in both directions along special guide rails 18 of an endless conveying member 17. Stop 19 extends downwardly from the driving carriage 16. Pivotal latch 15 contacts the stop 19 when the carriage 16 is moved from left to right as shown in FIG. 5 and the latch moves the carriage 8 by engagement with stop 14. When a carriage 8 traveling over the conveying track 2 reaches back stops at the unloading end of the track or, if a loading surface is being replaced, when the carriage 8 reaches a preceding stack located in the storage range S of the conveying track, note FIG. 1, the conveying member 17 is stopped by a suitable control device, not shown, and is set in motion in the opposite direction for transferring the next loaded carriage into the storage range S. When a loaded carriage is ready to be unloaded at the end of the conveying track 2, the driving carriage 16 underruns the carriage with the latch 15 bypassing the stop 14, that is, it is displaced out of the path of the stop 14. By reversing the direction of movement of the conveying member 17, it moves a new carriage 8 into the unloading position.

In the lower run of the conveying track formed by the second rails 6, a similar arrangement, that is, a mirror arrangement of that shown in FIG. 5, is provided for returning the empty carriage to the stack-forming position. The carriages 8 are returned after the stacks of bags have been removed by the unloading device 3. The unloading operation can be performed in the raised position of track section 7 or in its lowered position.

Unloading device 3 includes an undercarriage 20 movable over the rails 4. A slide carriage 21 is movable relative to the undercarriage 20. The slide carriage 21 includes the prong-shaped support member 11 which is movable vertically and horizontally relative to the slide carriage and transversely of the elongated direction of the conveying track 2. Slide carriage 21 includes a stationary stripping plate 22. After a stack 12 has been placed on the loading surface of the truck 13, the stripping plate 22 abuts one side of th stack and by withdrawing the prong-shaped support member 11 transversely of the stripping plate the stack can be positioned on the loading surface.

The transverse movement of the support member 11 relative to the slide carriage 21 could be omitted if pallets were placed on the loading surface with the pallets having recesses which open at the top in the same manner as the recesses in the carriages 8. In such an arrangement, if the prong-shaped support member 11 cantilevers outwardly from the slide carriage 21, a simple movement of the carriage withdrawing it from the support surface along with a lowering of the support member relative to the top of the pallet would be sufficient for placing a stack on the pallet. The prong-shaped support member is vertically movable relative to the slide carriage 21 by a guide and driving means, not shown in detail. The support member 11 can be moved vertically after it has been inserted into the recesses 10 of the carriage 8 so that any differences in height between the first rails 5 of the conveying track 2 and the loading surface of the truck 13 are of no consequence.

Figure 6:
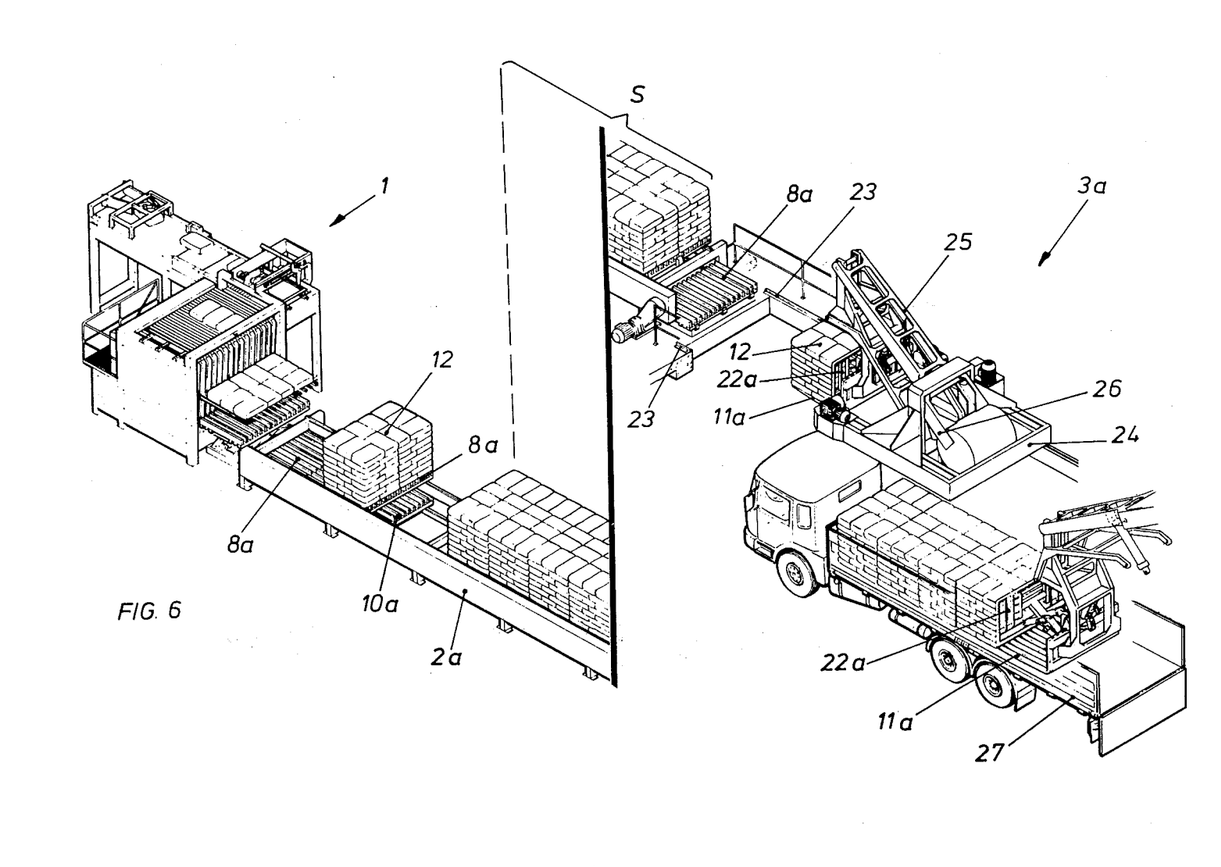
FIG. 6 is a perspective view of another apparatus embodying the present invention similar to that shown in FIG. 1 except that unloading is effected from the end of the conveying track rather than its side as in FIG. 1.

In the apparatus shown in FIG. 6, a stacking device 1 is located at the lefthand end for supplying stacked layers of bags onto a conveying track 2a similar to the track shown in FIGS. 1-5 and, therefore, not described in detail. It should be noted that the various parts of the device in this embodiment are positioned at a higher level off the ground and that a crane bridge 24 is positioned at the unloading end of the conveying track. Crane bridge 24 is movable along crane rails 23 extending in the same general direction as the conveying track. Unloading device 3a includes the crane bridge 24. A cantilever member 25 with a counterweight arm 26 is pivotally supported on the crane bridge about a horizontal axis extending transversely of the direction of the conveying track. The pivotal axis for the cantilever is not shown in detail. At the free end of the cantilever 25 a prong-shaped support member 11a is provided. Support member 11a is movable transversely of a stripping plate 22a in the longitudinal direction of the conveying track 2a and of the crane rails 23. The extent of horizontal movement of the prong-shaped carrying member 11a equals at least the dimension of a stack extending in the direction of movement of the conveying track. After moving the crane bridge 24 over the rails 23 into position over the loading surface of the truck 27, by moving the stripping plate relative to the support member in the direction of movement of the conveying track the stack 12 can be moved off the support member 11a onto the loading surface on the truck with the withdrawal movement of the support member being effected by retracting the crane bridge 24.

To enable the removal of stacks 12 from the carriages 8a on the conveying track 2a using the unloading device 3a, the carriages are provided with recesses 10a open to the support surface of the carriage and extending in the direction of movement along the conveying track. Incidentally, this change in orientation of the recesses does not alter the function of the conveying track 2a of the carriages 8a.

Figure 7:
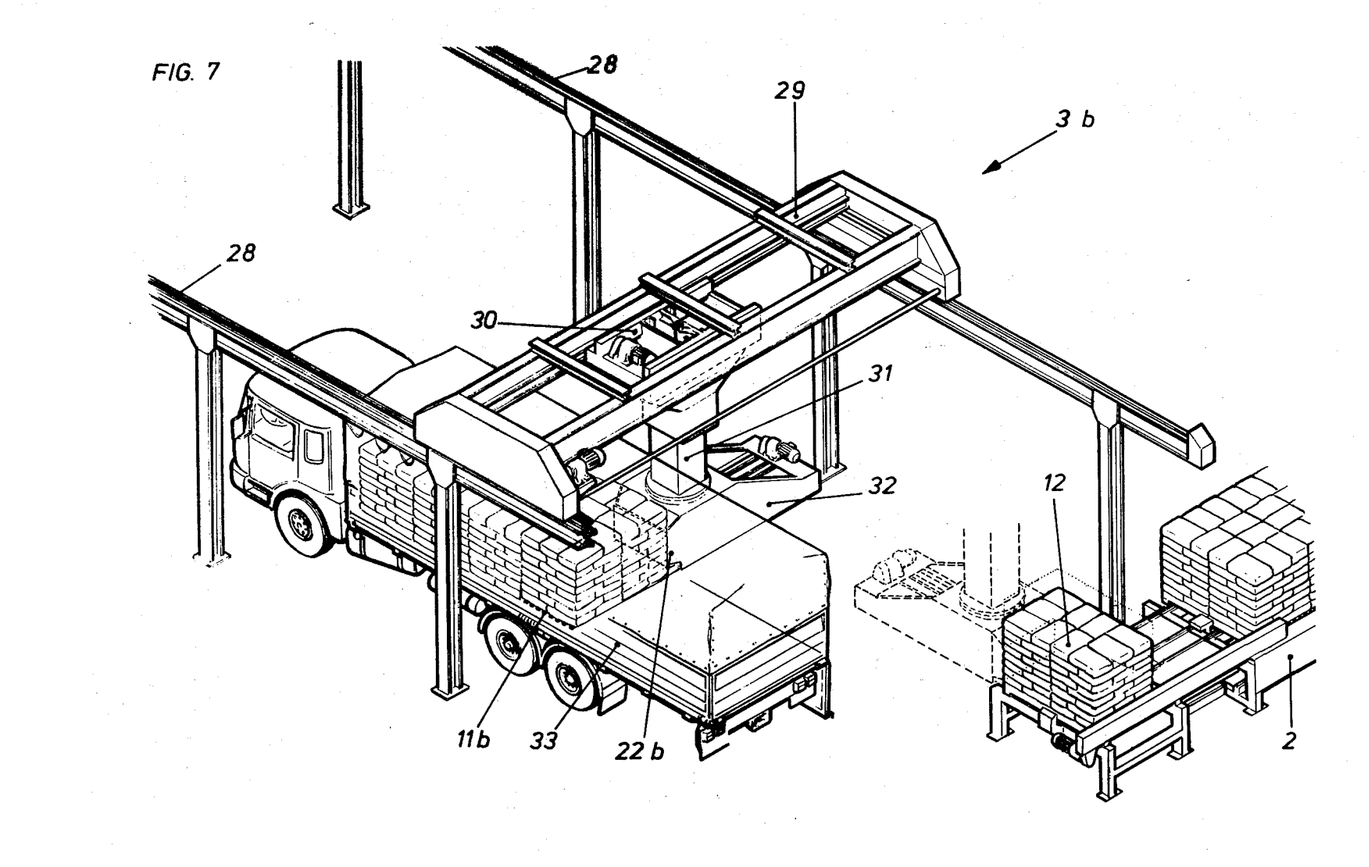
FIG. 7 is a perspective view of a further embodiment of the present invention with still another variation of the unloading device.

In FIG. 7, the loading end of conveying track 2 is the same in FIGS. 1 to 5, while an unloading device 3b is positioned at its other end. The unloading device 3b includes elevated crane rails 28 extending perpendicularly of the conveying track 2. A crane bridge 29 spans and is movable along the crane rails 28 and a crane carriage 30 is supported on and movable over the crane bridge between the rails. Crane carriage 30 includes a support column depending downwardly from it. The support column 31 can be rotated about a vertical axis and can be raised and lowered. Attached to the lower end of the support column 31 are horizontal guides 32 with a stripping plate 22b secured to and extending transversely of the horizontal guides. A prong-shaped support member 11b extends horizontally outwardly from the guides 32 for a length similar to the corresponding dimension of a stack 12. The support member 11b lifts a stack 12 from the conveying track 2 and then carries it to and places it on the loading surface of a truck 33.

As can be appreciated from the apparatus shown in FIG. 7, the placement of the stacks of bags on the loading surface of the truck can be performed in various directions, from the top, from the side and also from the rear. Moreover, the loading operation can be performed independently of whether the conveying track has carriages with longitudinally or transversely extending recesses.

In FIGS. 8 to 11 another arrangement of apparatus for moving stacks of bags from a stacking device to an unloading device is shown with a conveying track 2c formed by two pair of parallel rails 34,35 with a separate carriage 36,37 provided on each pair of rails with the carriages arranged alongside one another. In combination, the two carriages 36,37 form a unit similar to the carriage 8 in FIG. 1. In addition to the upper pairs of rails 34 and 35, the conveying track 2c also includes two pair of lower rails 38,39. The drive for the individual carriages corresponds to the drive for the carriages 8 and 8a in the embodiments shown in FIGS. 1 to 7, accordingly, the drive is not described or shown in detail. The two carriages 36 and 37 are interconnected except when they are at the stack-loading end of the conveying track 2c. The carriages are interconnected, note FIG. 9, by a recess provided in the side of the carriage 36 and a corresponding pin 41 on the carriage 37 which extends into the recess 40 for interengaging the carriages.

At the unloading end of the conveying track 2c, an unloading device 3c is arranged similar to the corresponding device in the apparatus displayed in FIGS. 1 to 5. At the stack-loading end of the conveyor track 2c, a stacking device 1c is arranged which forms half stacks. The half stacks are combined on the carriages 36 and 37 and are removed as a single unit or full stack by the unloading device 3c at the opposite end of the conveying track.

Figure 8:
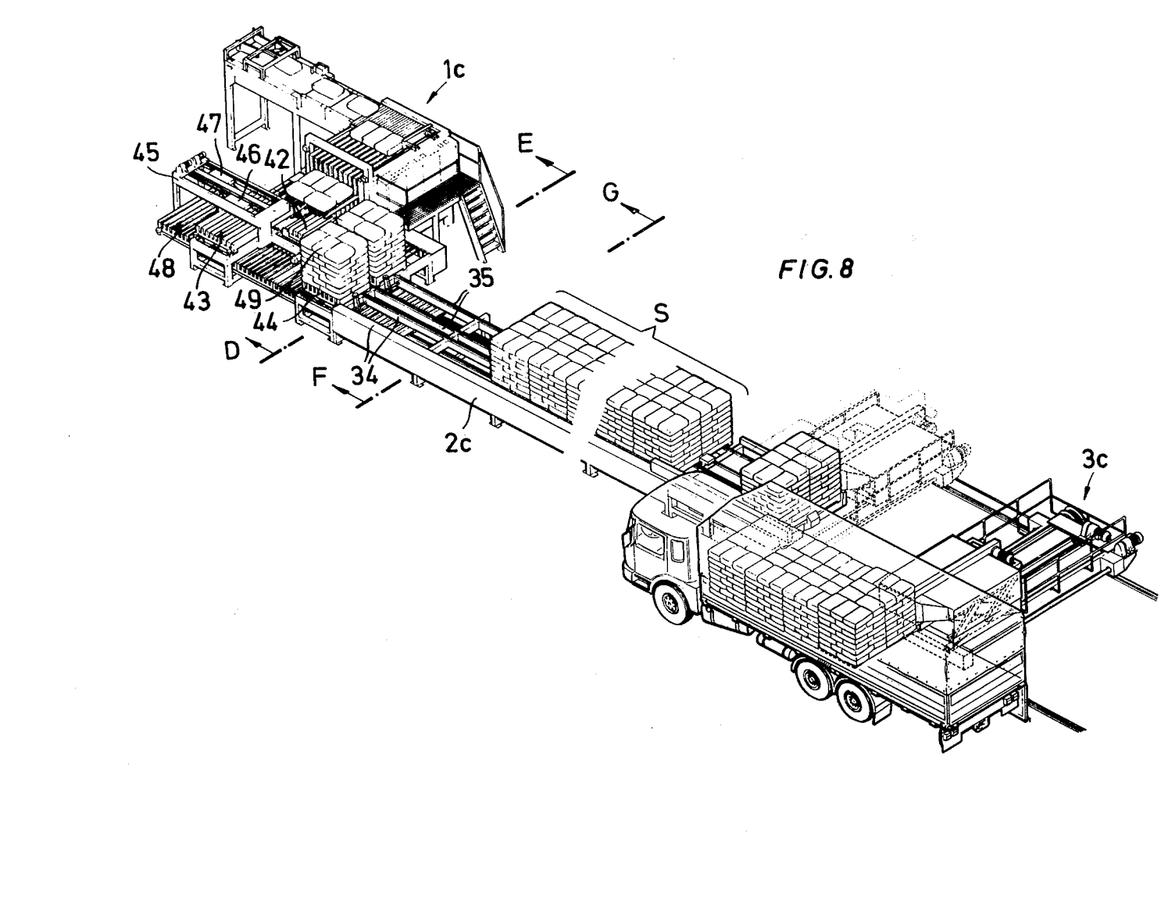
FIG. 8 is a perspective view of yet another embodiment of the present invention in which half stacks are placed one on each of a pair of carriage members with the carriage members being interconnectable for movement as a unit over the conveying track, the stacking device and the unloading device being similar to that shown in FIG. 1.
Figure 9:
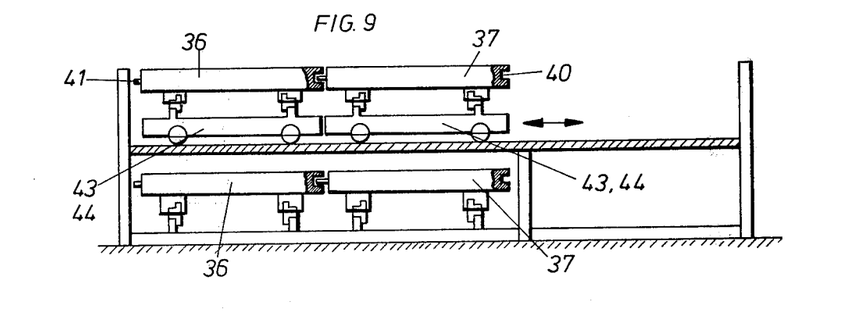
FIG. 9 is a schematic view taken along the line D-E in FIG. 8.
Figure 10:
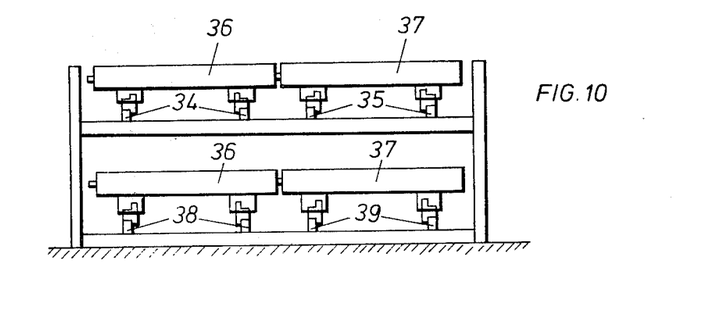
FIG. 10 is a schematic view taken along the line F-G in FIG. 8.

At the loading end of the conveying track 2c, a stack-loading plate or position 42 is provided for receiving half stacks, as mentioned above. On one side of the stack-loading plate 42, that is, the side spaced further from the end of the conveying track, there is a track section 43 and between the plate 42 and the end of the conveying track is another track section 44. Both of the track sections 43 and 44 are movable transversely of the elongated direction of the conveying track. Each track section 43,44 includes two pair of rails with the pairs of rails being movable transversely relative to one another. FIG. 9 illustrates the track sections 43 and 44.

Adjacent the loading end of the conveying track 2c is a frame 45. The frame 45 has guiding and driving means, not shown in detail, for two carriage pushers 46,47 arranged parallel but being slidable independently of one another. These carriage pushers 46,47 act in the manner described later on herein to slide the carriages 36,37 onto and off of the transversely movable track sections 43,44. The sequence of movement of the carriages and track sections is now set forth in detail with reference to FIG. 11.

Figure 11:
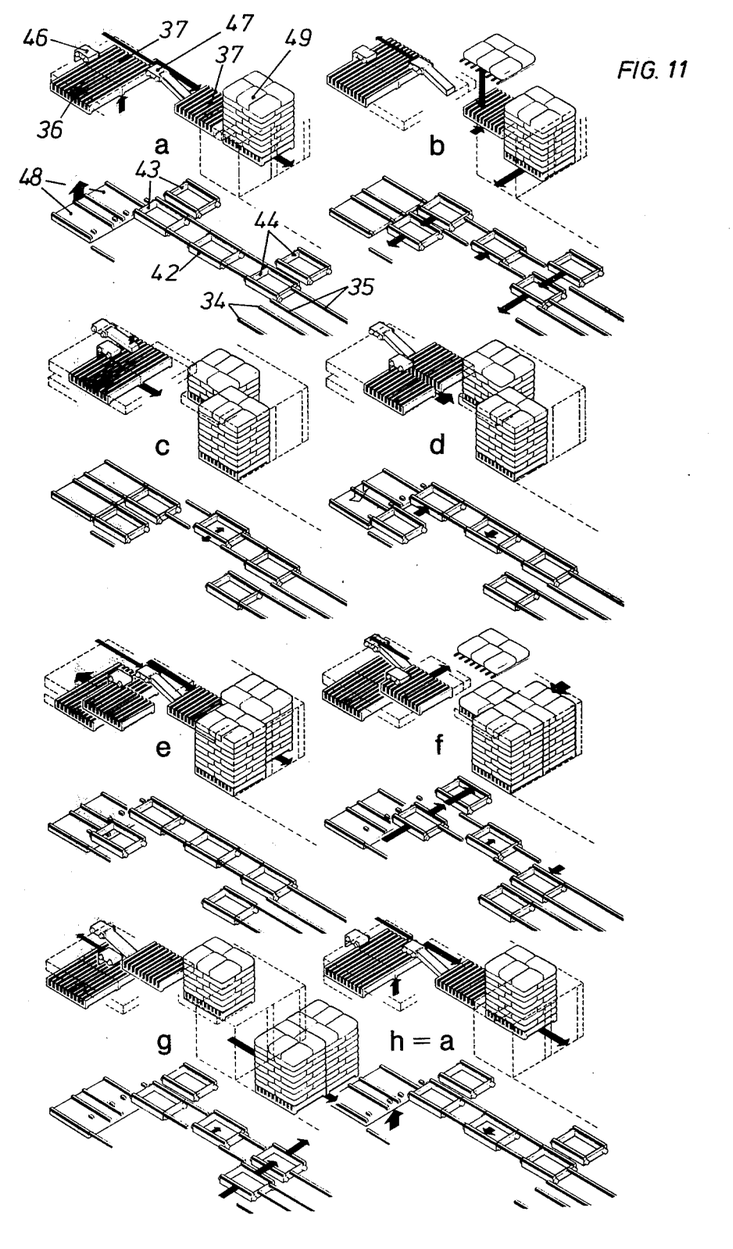
FIG. 11 is a perspective view of the various steps performed in operating the apparatus disclosed in FIGS. 8–10 and with the carriages shown spaced vertically upwardly from the rail of the conveying track.

In FIG. 11, a complete cycle of operation is shown for the loading end of the conveying track 2c with the individual steps being identified as a to h. At the end of conveying track 2c adjacent the stacking device 1c is a track section 48 containing two parallel sets of rails. This track section is similar to track section 7 in the embodiment illustrated in FIG. 4. It can be moved vertically between the end of the lower run of the conveying truck 2c and the level of the track section 43 which is movable transversely of the conveying track. In operating position a the track section 43 is moved transversely so that one of its pairs of rails is aligned with the stack-loading position 42 and the pair of rails 35 while its other pair of rails is displaced laterally out of alignment with the rails in the conveying track. The two pairs of rails in the track section 44 have been moved transversely of the conveying track in the same manner as the track section 43. In this position, a half stack 49 has been built by the stacking device 1c. After completing this half stack, the carriage 36 located on the pair of rails of the track section 43 aligned with the stack-loading position 42 is moved into the stack-loading position by the carriage pusher 47 and the loaded carriage in the stack-loading position is moved off onto the pair of rails on the track section 44 in alignment with the stack-loading position.

In the next operating position b, the track sections 43,44 are moved in the transverse direction so that the pair of rails out of alignment with the conveying track are moved into alignment with the rails 35 of the conveying track. In this position the track sections 43,44 are in general alignment with the conveying track. At the same time, another half stack is readied at the stack-loading position 42. After this second stack has been completed, two carriages 36,37 are pushed by the carriage pushers 46,47 on the frame 45 from the track section 48 onto the transversely movable track section 43, not position c. In the following step, note position d, the rearward carriage 37 is moved a short distance transversely away from the forward carriage 36. The means for separating the pairs of rails forming the track section 43 are not shown. When the pairs of rails of the track section 43 are displaced laterally relative to one another, the pin 41 on the carriage 37 is separated from the recess 40 in the carriage 36. The carriage pusher 47 then displaces the next carriage onto the stack-loading position 42 displacing the carriage previously positioned there. The displaced carriage now supporting a full half stack is moved onto the rear portion of the track section 44, note position e. In the next position f, the rearward pair of rails of the track section 44 are moved forwardly toward the other pair of rails so that the loaded carriages are aligned with the rails of track sections 34,35. When this is done, the pin 41 in the rearward carriage engages the recess 40 in the forward carriage and the two carriages each carrying half a stack are interconnected so that they combine to form a unit supporting a whole stack. The whole stack on the two carriages is then conveyed onto the track sections 34,35 making up the conveying track while, as shown in position f, the track section 43 is again moved transversely with the subsequent movement of the track section 44 in the transverse direction after the stack has been moved onto the conveying track, see position g. At this point, the forward carriage, as viewed in FIG. 11, located on track section 43, is moved into the stack-loading position 42 by the pusher 47, note position h.

During the movement of the empty carriage into the stack-loading position, the loading carriage previously in that location is moved onto the portion of the track section 44 aligned with the stack-forming location. Accordingly, the cycle of operation has been completed and a new cycle is commenced.

The means affording the transverse movement of the track sections 43,44 as shown in FIG. 11, merely serves for better stack formation and is not significant for understanding the above-described operating cycle, accordingly, the means for effecting the transverse movement has not been described.

While specific embodiments of the invention have been shown and described in detail to illustrate the application of the inventive principles, it will be understood that the invention may be embodied otherwise without departing from such principles.

What is claimed is:

1. Apparatus for automatically handling bags comprising a first means for forming bags continuously received from a source into a stack consisting of a number of superposed layers of bags, an elongated conveying track having a first end and a second end with the first end positioned adjacent said first means for receiving a stack of bags therefrom, said track arranged to convey a stack of bags from the first end to the second end thereof, said conveying track including a support member for receiving the stack of bags and said support member having a support surface on which the stack rests and said support member having a plurality of recesses formed therein open to and extending downwardly from the support surface, second means for removing a stack of bags from said support member at the second end of said conveying track and for placing the stack on a loading surface wherein the improvement comprises that said conveying track comprises first rails and second rails extending horizontally from said first end to said second end thereof with said first rails being spaced above said second rails, said support member comprises a carriage movably mounted on said rails for transport between the first and second ends thereof, third means at said second end of said track for receiving said carriage from said first rails and for moving the carriage in the vertical direction and placing said carriage on said second rails, and fourth means at the first end of said track for moving said carriage from said second rails to said first rails.

2. Apparatus, as set forth in claim 1, wherein said carriage comprises a pair of carriage members providing, in combination, the support surface for a stack of bags and each forming a portion of the support surface, said first rails comprising a first set of said first rails for movably supporting one of said pair of carriage members and a second set of said first rails for movably supporting the other one of said pair of carriage members, said first means including a stack-loading member aligned with said first rails and positioned at the first end thereof, said stack-loading member forming a stack-loading position, said conveying track including a first track section and a second track section each located on an opposite side of said stack-depositing member and being movable transversely of the direction of said conveying track, said first track section located on the opposite side of said stack-depositing member from said first rails and said second track section located between said stack-loading member and said first rails, each said first and second track section capable of supporting said pair of carriage members so that said carriage members can be individually moved from said first track section to the stack-loading position and then to said second track section whereby each said carriage member receives a partial stack of bags in the stack-loading position, said carriage members each supporting a portion of a stack of bags with the combination of the two portions forming a full stack of bags and said carriage members being movable from said track section to said first rails for movement thereover from said first end to the second end of said conveying track.

3. Apparatus, as set forth in claim 2, including connecting means for releasably interconnecting said pair of carriage members for movement as a unit over said conveying track.

4. Apparatus, as set forth in claim 3, wherein said first and second track sections each having two pair of rails thereon and each said pair of rails being parallel to the other and being displaceable toward and away from the other.

5. Apparatus, as set forth in claim 1, wherein said second means comprises a horizontally extending prong-shaped support member insertable into the recesses in said carriage for lifting the stack of bags off the support surface on said carriage, said prong-shaped support member is movable horizontally in the direction of insertion into said recesses and movable vertically for lifting the stack of bags off the support surface on said carriage and said second means including said prong-shaped support member is movable in the elongated direction of said conveying track for moving the removed stack to the loading surface.

6. Apparatus, as set forth in claim 5, wherein said second means includes a stripping plate extending transversely across said prong-shaped support member and said prong-shaped support member is horizontally movable relative to said stripping plate so that a stack of bags on said prong-shaped support member can be displaced therefrom onto the loading surface.

7. Apparatus, as set forth in claim 5, wherein said recesses in the support surface of said carriage extend transversely of the elongated direction of said conveying track and said prong-shaped support member is movable horizontally transversely of the elongated direction of said conveying track for movement into the recesses into position for lifting a stack of bags on the support surface of said carriage.

8. Apparatus, as set forth in claim 5, wherein said recesses in the support surface of said carriage extend in the elongated direction of said conveying track, and said prong-shaped support member is movable horizontally in the elongated direction of said conveying track for movement into the recesses into position for lifting a stack of bags located on the support surface on said carriage.

9. Apparatus, as set forth in claim 8, wherein said second means includes crane rails extending in the elongated direction of said conveying track, a crane supported on and movable along said crane rails, said crane including a cantilever member pivotally supported at one end to said crane, said prong-shaped support member attached to said cantilever member at a position spaced from the one end thereof, said cantilever member being pivotally movable about a horizontal axis extending across the elongated direction of the conveying track.

10. Apparatus, as set forth in claim 5, wherein said second means includes crane rails, a bridge member spanning and supported on said crane rails, a carriage movably mounted on said bridge member between said crane rails, a support column rotatably supported on and depending downwardly from said carriage, said support column rotatable about a vertical axis, and said prong-shaped support member secured to said support column and said support column is movable in the vertical direction for raising and lowering said prong-shaped support member.

11. Apparatus, as set forth in claim 1, including driving means mounted on each of said first and second rails, said driving means being releasably engageable with said carriage for moving said carriage along said first rails and said second rails.

* * * * *